(12) United States Patent
Panainte et al.

(10) Patent No.: US 9,779,723 B2
(45) Date of Patent: Oct. 3, 2017

(54) MULTI-PASS VEHICLE VOICE RECOGNITION SYSTEMS AND METHODS

(71) Applicant: Johnson Controls Technology Company, Holland, MI (US)

(72) Inventors: Sorin M. Panainte, Taylor, MI (US); David J. Hughes, Jenison, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/409,741

(22) PCT Filed: Jun. 21, 2013

(86) PCT No.: PCT/US2013/047083
§ 371 (c)(1),
(2) Date: Dec. 19, 2014

(87) PCT Pub. No.: WO2013/192535
PCT Pub. Date: Dec. 27, 2013

(65) Prior Publication Data
US 2015/0379987 A1    Dec. 31, 2015

Related U.S. Application Data

(60) Provisional application No. 61/663,423, filed on Jun. 22, 2012.

(51) Int. Cl.
*G10L 15/08* (2006.01)
*G10L 15/32* (2013.01)
(Continued)

(52) U.S. Cl.
CPC .............. *G10L 15/08* (2013.01); *G10L 15/28* (2013.01); *G10L 15/32* (2013.01); *H04R 1/08* (2013.01);
(Continued)

(58) Field of Classification Search
CPC ...................................................... G10L 15/32
See application file for complete search history.

(56) References Cited

U.S. PATENT DOCUMENTS 5,440,662 A * 8/1995 Sukkar .................. G10L 15/142
704/236
6,195,634 B1 * 2/2001 Dudemaine ........... G10L 15/063
704/231
(Continued)

FOREIGN PATENT DOCUMENTS

| CN | 101071564 A | 11/2007 |
| JP | 2007-041319 A | 2/2007 |
| WO | WO-2007/048053 A1 | 4/2007 |

OTHER PUBLICATIONS

International Preliminary Report on Patentability and Written Opinion of the International Searching Authority dated Dec. 31, 2014, in PCT/US2013/047083, 9 pages.
(Continued)

*Primary Examiner* — Brian Albertalli
(74) *Attorney, Agent, or Firm* — Foley & Lardner LLP (57) ABSTRACT

A voice recognition system for a vehicle includes a microphone for receiving speech from a user. The system further includes a memory having a partial set of commands or names for voice recognition. The memory further includes a larger set of commands or names for voice recognition. The system further includes processing electronics in communication with the microphone and the memory. The processing electronics are configured to process the received speech to obtain speech data. The processing electronics are further configured to use the obtained speech data to conduct at least two voice recognition passes. In a first pass, the speech data is compared to the partial set. In a second pass, the speech data is compared to the larger set.

20 Claims, 4 Drawing Sheets

(51) Int. Cl.
  *G10L 15/28*   (2013.01)
  *H04R 1/08*   (2006.01)
  *G10L 15/22*   (2006.01)

(52) U.S. Cl.
  CPC .. *G10L 2015/227* (2013.01); *G10L 2015/228* (2013.01)

(56) References Cited

U.S. PATENT DOCUMENTS

| | | | | |
|---|---|---|---|---|
| 8,700,392 | B1* | 4/2014 | Hart | G10L 15/25 704/231 |
| 2002/0013710 | A1* | 1/2002 | Shimakawa | G06F 3/16 704/275 |
| 2002/0165715 | A1* | 11/2002 | Riis | G10L 15/08 704/254 |
| 2003/0236664 | A1 | 12/2003 | Sharma | |
| 2007/0038449 | A1 | 2/2007 | Coifman | |
| 2007/0265849 | A1 | 11/2007 | Grost et al. | |
| 2008/0010058 | A1 | 1/2008 | Weng et al. | |
| 2008/0059188 | A1* | 3/2008 | Konopka | G10L 15/22 704/257 |
| 2008/0162137 | A1* | 7/2008 | Saitoh | G10L 15/22 704/251 |
| 2008/0189106 | A1* | 8/2008 | Low | G01C 21/3608 704/231 |
| 2010/0004930 | A1* | 1/2010 | Strope | G10L 15/32 704/240 |
| 2010/0013760 | A1* | 1/2010 | Hirai | G10L 15/22 345/156 |
| 2010/0082343 | A1* | 4/2010 | Levit | G10L 15/32 704/257 |
| 2010/0312557 | A1* | 12/2010 | Strom | G10L 15/065 704/246 |
| 2011/0004462 | A1* | 1/2011 | Houghton | G10L 15/183 704/9 |
| 2011/0010177 | A1* | 1/2011 | Nakano | G10L 15/18 704/257 |
| 2013/0289996 | A1* | 10/2013 | Fry | G10L 15/32 704/257 |

OTHER PUBLICATIONS

International Search Report and Written Opinion in PCT/EP2013/047083 dated Oct. 21, 2013, 12 pages.
Office Action dated Jan. 26, 2017, received in corresponding European application No. 13 734 593.0, 7 pages.
Xuedong Huang et al: "Microsoft Windows highly intelligent speech recognizer: Whisper", 1995 International Conference on Acoustics, Speech, and Signal Processing; May 9-12, 1995; Detroit, MI, USA, IEEE, New York, NY, USA, vol. 1, May 9, 1995 (May 9, 1995), p. 93-96, XP010625177, DOI: 10.1109/ICASSP.1995.479281—ISBN: 978-0-7803-2431-2.
Office Action dated Mar. 3, 2017, received in corresponding Chinese application No. 201380043053.5, 10 pages and English translation (13 pages).
Examination Report dated Jun. 13, 2017, received in corresponding European application No. 13 734 593.0, 8 pages.

* cited by examiner

MULTI-PASS VEHICLE VOICE RECOGNITION SYSTEMS AND METHODS

CROSS REFERENCE TO RELATED APPLICATIONS

The present application is a U.S. National Stage of International Application No. PCT/US2013/047083 filed on Jun. 21, 2013, which claims the benefit of U.S. Provisional Patent Application No. 61/663,423, entitled "Multi-pass Vehicle Voice Recognition Systems and Methods," filed on Jun. 22, 2012, the entire disclosures of all of which are incorporated herein by reference.

BACKGROUND

The present invention relates generally to the field of vehicle-based voice recognition systems and methods.

Some voice recognition systems attempt to recognize a large number of words, phrases or names. It is challenging and difficult to develop voice recognition systems that provide the user with the feel of high accuracy and rapid response times. The use of a large vocabulary results in slower voice recognition response times. Conventional voice recognition systems attempt to speed perceived response times by prompting the user for discrete pieces of a command or task (e.g., "which state?", "which city?", etc.).

SUMMARY

One embodiment of the present disclosure relates to a voice recognition system for a vehicle. The voice recognition system includes a microphone for receiving speech from a user. The voice recognition system further includes a memory including a partial set of commands or names for voice recognition, and a larger set of commands or names for voice recognition. The voice recognition system further includes processing electronics in communication with the microphone and the memory. The processing electronics are configured to process the received speech to obtain speech data. The processing electronics are further configured to use the obtained speech data to conduct at least two voice recognition passes. In a first pass, the speech data is compared to the partial set. In a second pass, the speech data is compared to the larger set.

Another embodiment of the present disclosure relates to a computerized method for use by a voice recognition system for a vehicle. The method includes receiving speech from a user at a microphone. The method further includes loading a partial set of commands or names from memory. The method further includes conducting a first voice recognition pass by comparing a representation of the received speech to the loaded partial set of commands or names. The method further includes making a voice recognition decision when a match is obtained that meets or exceeds a first confidence level. The method further includes, when the match is not obtained in the first voice recognition pass, conducting a second voice recognition pass by comparing the representation of the received speech to a complete set of commands or names, the complete set larger than the partial set. The method further includes at least one of outputting an indication of the match from the first voice recognition pass or a match from the second voice recognition pass for user confirmation; and executing a vehicle function based on the match from the first voice recognition pass or a match from the second voice recognition pass.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Referring generally to the figures, a voice recognition system for a vehicle is shown, according to exemplary embodiments. The voice recognition system is able to provide faster speech recognition by comparing received speech (e.g., data representing the speech) to a selected small set of grammars (e.g., voice commands, names, voice tags, favorite locations, favorite contacts, etc.) in a first voice recognition pass. If the first pass is successful, the perceived speed of the system is very fast. If the first pass is not successful, the system will conduct a second pass using a larger (e.g., complete) set of possible grammars (e.g., a complete address book, a complete phone book, a complete command list, etc.).

In an exemplary embodiment, a voice recognition system for a vehicle includes a microphone for receiving speech from a user. The system further includes a memory having a partial set of commands or names for voice recognition. The memory further includes a larger set of commands or names for voice recognition. The system further includes processing electronics in communication with the microphone and the memory. The processing electronics are configured to process the received speech to obtain speech data. The processing electronics are further configured to use the obtained speech data to conduct at least two voice recognition passes. In a first pass, the speech data is compared to the partial set. In a second pass, the speech data is compared to the larger set.

The memory may be local to (e.g., be a part of, be locally coupled to, etc.) the processing electronics. The processing electronics may require a first level of confidence when determining whether a match exists in the first pass and a second level of confidence when determining whether a match exists in the second pass. The processing electronics may be configured to skip the second pass when the required first level of confidence is met or exceeded in the first pass. The processing electronics may be configured to adaptively update the first confidence level based on user feedback received at the microphone or received at a user input device. A different confidence level for the first pass and a different partial set of commands or names may be associated with different users of the vehicle or different user devices. The partial set of commands or names for voice recognition may include at least one of: (a) a partial set of commands, (b) a partial set of voice tags, and (c) a set of user-specified favorite contacts or user-specified favorite phonebook names. In other embodiments, the partial set of commands or names for voice recognition may include at least one of: (a) a set of most frequently used commands, (b) a set of most frequently used voice tags, and (c) a set of most frequently used contacts or phonebook names. The processing electronics may be further configured to update the partial set of commands or names for voice recognition in the first pass as the frequency of use changes for the commands or names.

Another embodiment of the invention relates to a computerized method for use by a voice recognition system for a vehicle. The method includes receiving speech from a user at a microphone. The method further includes loading a partial set of commands or names from memory and conducting a first voice recognition pass by comparing a representation of the received speech to the loaded partial set of commands or names. The method then includes making a voice recognition decision when a match is obtained that meets or exceeds a first confidence level. When the match is not obtained in the first voice recognition pass, a second voice recognition pass is conducted by comparing the representation of the received speech to a complete set of commands or names. The complete set is larger than the partial set. The method further includes at least one of: (a) outputting an indication of the match from the first voice recognition pass or a match from the second voice recognition pass for user confirmation, and (b) executing a vehicle function based on the match from the first voice recognition pass or a match from the second voice recognition pass.

In a preferred embodiment, the first and second pass are conducted without assistance from a remote system and the partial set and the complete set are loaded from memory local to the voice recognition system. In other embodiments, the partial set may be loaded from local memory while a more complete set is received from another device (e.g., a mobile phone, a tablet, etc.).

In an exemplary embodiment, a second confidence level is used to compare the representation of the received speech to the complete set of commands or names. The first confidence level and the second confidence level may be different. The first confidence level may be higher than the second confidence level. The method may include adaptively updating the first confidence level based on user feedback received at the microphone or received at a user input device. The adaptive updating may include raising the first confidence level in response to the user feedback indicating that results of first passes were not correct. The adaptive updating may further include lowering the first confidence level in response to the user feedback indicating that results of the first passes were correct. The method may further include maintaining a different partial set of commands or names for each of a plurality of different users or user devices of the voice recognition system. The partial set of commands or names for voice recognition include at least one of: (a) a set of most frequently used commands, (b) a set of most frequently used voice tags, and (c) a set of most frequently used contacts or phonebook names. The method may further include updating the partial set of commands or names for voice recognition in the first pass as the frequency of use changes for the commands or names.

Figure 1A:
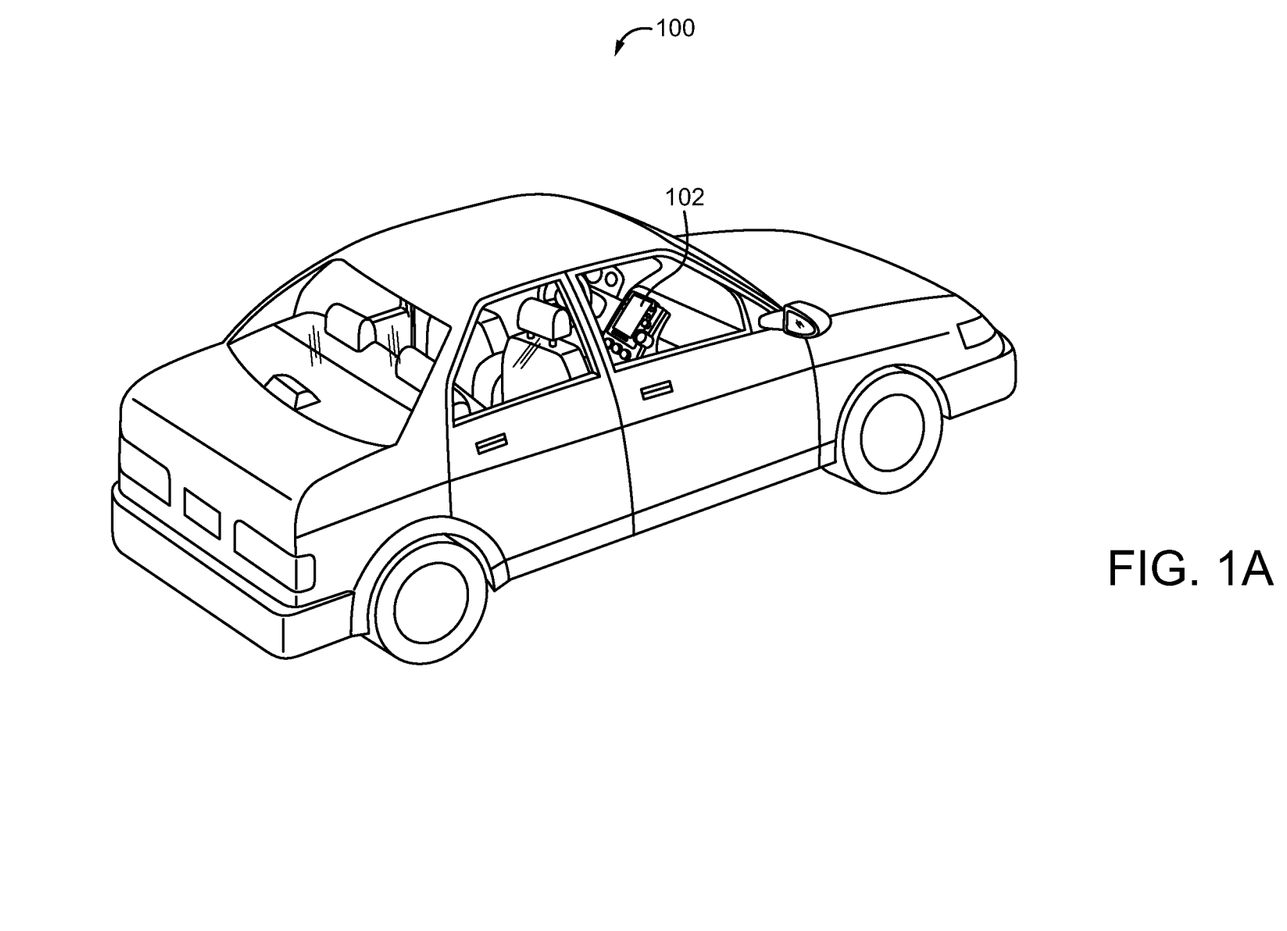
FIG. 1A is a perspective view of a vehicle having a voice recognition system, according to an exemplary embodiment.
Figure 1B:
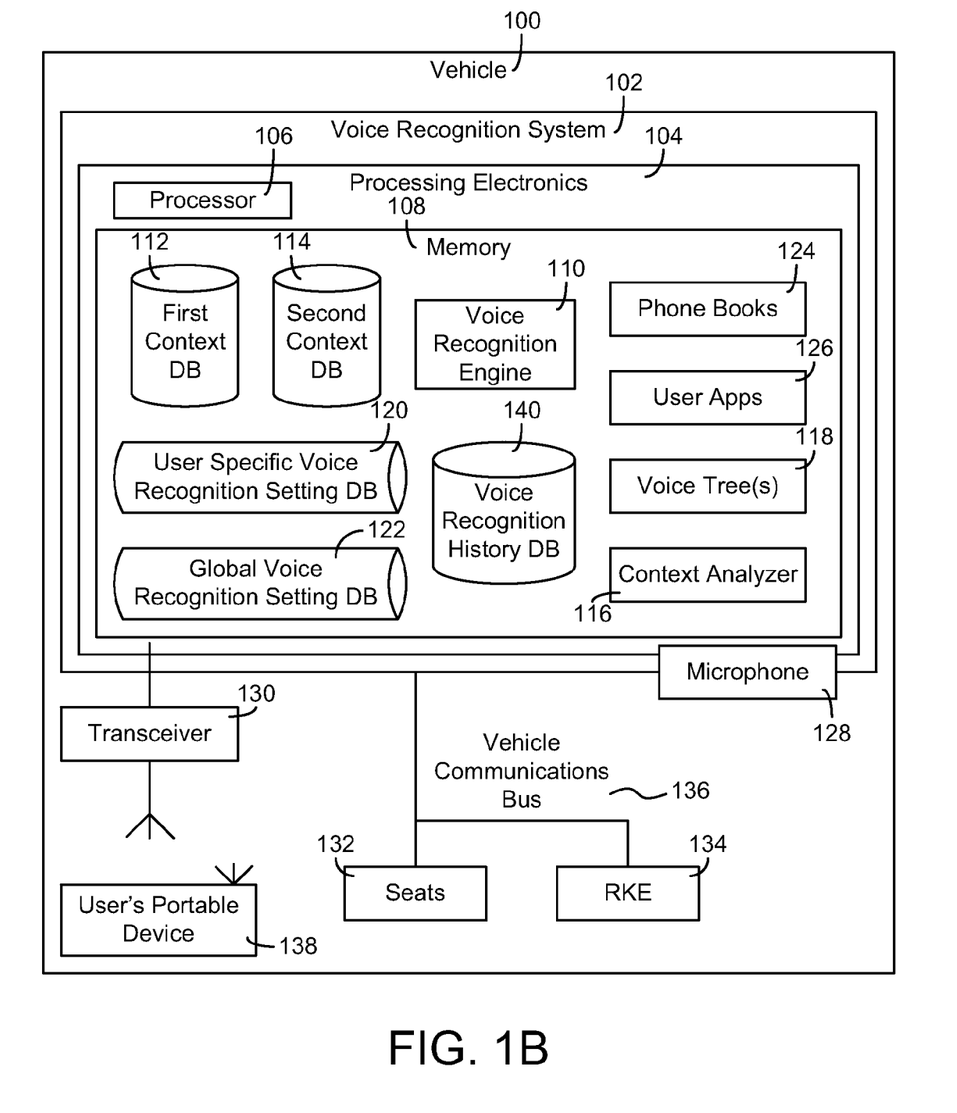
FIG. 1B is a block diagram of the voice recognition system of FIG. 1A, according to an exemplary embodiment.

With reference to FIGS. 1A and 1B, embodiments of the invention relate to a voice recognition system 102 for a vehicle 100. Voice recognition system 102 is shown as a part of vehicle 100. Voice recognition system 102 includes a microphone 128. Voice recognition system 102 or a coupled vehicle system may further include a transceiver 130 coupled to voice recognition system 102. Voice recognition system 102 may include or be coupled to any number of displays (e.g., LCD displays, touch screen displays, etc.) or any number of user interface elements (e.g., buttons, switches, touch screen elements for selection, dials, joysticks, steering-wheel mounted controls, etc.). The vehicle electronics system of vehicle 100 of which voice recognition system 102 is a component may include communications features (e.g., BLUETOOTH phone connectivity, garage door communications systems such as HOMELINK sold by Johnson Controls, etc.), user comfort and convenience features, safety features, entertainment features such as radio, or other user interfacing features.

In varying embodiments, voice recognition system 102 may be a part of or distributed across a variety of vehicle systems. For example, voice recognition system 102 may be a part of a vehicle navigation system or a stand-alone device that provides inputs and outputs to vehicle subsystems such as the vehicle navigation system, the vehicle HVAC system, the vehicle radio system, and the like. All such architectures and combinations thereof are within the scope of this disclosure. Claims may be presented in this or a subsequent application to narrow the invention to any one embodiment or set of embodiments.

Voice recognition system includes processing electronics 104. Processing electronics 104 are shown to include a processor 106 and memory 108. Processor 106 can be implemented as a general purpose processor, an application specific integrated circuit (ASIC), one or more field programmable gate arrays (FPGAs), a group of processing components, or other suitable electronic processing components. Processing electronics 104 can include one more printed circuit boards or point-to-point wirings of electronic components including processor 106 and memory 108.

Memory 108 is one or more devices (e.g., RAM, ROM, flash memory, hard disk storage, etc.) for storing data and/or computer code for completing and/or facilitating the various processes or steps described in the present disclosure. Memory 108 may be or include volatile memory or non-volatile memory. Memory 108 may include database components, object code components, script components, or any other type of information structure for supporting the various activities and information structures described in the present disclosure. According to an exemplary embodiment, memory 108 is communicably connected to processor 106 via processing electronics 104 and includes computer code for executing (e.g., by processing electronics 104 and/or processor 106) one or more processes described herein.

Voice recognition system 102 receives speech (i.e., analog or digital signals representative of speech) from a user via microphone 128. Processing electronics 104 are generally configured to use a set of rules (e.g., as a part of a knowledge base system, an expert system, etc.) and contexts (e.g., commands, voicetags, phonebook names, phrases, addresses, etc.) to evaluate user interactions with voice recognition system 102. Processing electronics 104 are configured to use two different contexts, at least a first partial context and a larger context, to conduct one or more voice recognition passes. The first partial context is executed first, in an effort to quickly recognize received speech. Processing electronics 104 may be further configured to adjust voice recognition system 102 in response to evaluations that occur during the voice recognition process.

Memory 108 is shown to include a number of modules and databases that may be executed, accessed, or otherwise utilized by the processor/processing electronics to provide the activities described herein, according to varying exemplary embodiments. Memory 108 includes a voice recognition engine 110 which will be described in greater detail in subsequent paragraphs. Memory 108 further includes a first context database 112 and a second context database 114. First context database 112 may be smaller than second context database 114. First context database 112 may be used by voice recognition engine 110 during a first voice recognition pass on received speech (e.g., data representing speech received at microphone 128). If the first pass is successful, the user may advantageously be satisfied with a fast perceived speed of voice recognition. If the first pass is not successful, voice recognition engine 110 uses the second pass to check the data representing the received speech against the contents of second context database 114.

In an exemplary embodiment, first context database 112 includes a partial set of commands or names (e.g., voicetags, names from an address book, names of locations, names of contacts, names for phone dialing, etc.). First context database 112 may be user set. For example, voice recognition system 102 may provide the user with a graphical user interface for configuring, populating, and/or editing the contents of first context database 112. In varying embodiments, first context database 112 may be automatically updated by voice recognition system 102 when certain events are conducted by the user. For example, if the user adds a contact to the user's list of favorite contacts, voice recognition system 102 may automatically cause that contact (e.g., or data relating to the contact for speech recognition purposes) to be added to first context database 112. First context database 112 and second context database 114 may be populated with data describing a phonemic representation for commands or names as well as a pointer to the details for the commands or names. For example, a phonemic representation of "John Smith" may be present in first context database 112 along with a pointer to John Smith's contact record in one or more phone books 124 stored in memory 108. Commands, names, and other objects in first context database 112 may be associated with user apps 126 (e.g., names of user apps, commands for entry into user apps, etc.). In an exemplary embodiment, first context database 112 is forced to include a relatively small number of records (e.g., under 50 commands and names, under 20 commands and names, under 12 commands and up to 20 names, under 100 commands and names, under 100 commands and no names, under 12 commands and under 12 names, under 25 names and a short list of commands, etc.). Second context database 114, on the other hand, may include a phonemic representation for all of the contacts in phone book 124, all of potential user applications 126, and all of the potential commands available to the user. In other embodiments, second context database 114 stores less than all of the possible commands or names, but stores significantly more (e.g., double or more) than first context database 112.

Memory 108 is further shown to include a context analyzer 116. Context analyzer 116 may be a computer code module that, when executed, provides a process for monitoring the most-used commands or names and for adaptively moving the most-used commands or names into first context database 112. Less frequently used commands or names can be moved out of first context database 112. Context analyzer 116 may be configured to work in concert with user selections for first context database 112. For example, in some embodiments the user can select static commands and names for first context database 112. In other words, the user can select names and commands that will stay in first context database 112 regardless of frequency of use. This set of names and commands can then be supplemented by names and commands added by context analyzer 116.

In addition to or as an alternative to causing the most frequently used commands and names to be a part of first context database 112, in some embodiments context analyzer 116 may populate first context database 112 with the most recently used (e.g., judged by order or time) items. Therefore, for example, if the user has most recently called Paul and Mary, using the command "dial" and the voicetags "Paul" and "Mary," context analyzer 116 may have inserted "dial," "Paul" and "Mary" into first context database 112 for low latency retrieval.

As noted above, in some embodiments first context database 112 can include speech items or parts of types other than commands and contact names. Other item types in first context database 112 may include frequently used address locations or address parts (e.g., "Michigan," "Restaurant", "North Ave."), frequently used media tags, frequently used radio stations, or emergency speech parts regardless of frequency of use (e.g., "dial 911", "emergency", "dial roadside assist").

Voice recognition engine 110 is primarily responsible for operating the main routine or features of voice recognition system 102 (e.g., using voice recognition processing and associated logic of signals from microphone 128 to provide feedback, commands, or information to the telematics system). Voice recognition engine 110 can process the contents of first context database 112, second context database 114, and/or a voice tree or trees 118 in view of stored settings, to execute vehicle system functions (e.g., phone dialing, navigation tasks, etc.).

It should be noted that different context databases (or portions of the two context databases) may be stored or associated with different users of voice recognition system 102. Voice recognition system 102 may be configured to identify a user based on a single factor or multiple factors. Voice recognition system 102 may be configured to request that a user provide input when the user enters vehicle 100 to provide such identification (e.g., ask the user to speak his or her name, prompt the user to press a touch screen area for selection of a name on a graphical user interface, etc.). In some embodiments the user identifier can be configured to check vehicle seat 132 positions to determine the identity of the user.

In the same or yet other embodiments, the system can be configured to process an identity of the user's remote keyless entry (RKE) device 134. A user recognition module stored in memory 108 may conduct such a process. In such an embodiment, for example, the RKE subsystem of the vehicle can provide the identity to voice recognition system 102 (e.g., a user recognition module thereof) via the vehicle communications bus 136. In other exemplary embodiments, the user identifier can process other inputs available on vehicle communications bus 136 or otherwise available to the telematics system to conduct the user identification. In an exemplary embodiment, the user identifier uses data from transceiver 130 (e.g., a Bluetooth transceiver, a USB transceiver, etc.) to determine the identity of the user based on a user's portable device 138. In other words, the user identification feature may operate by determining which mobile phone is within the vehicle cabin and connected to transceiver 130 for use in telematics activities.

When a user is recognized, settings may be pulled from user specific voice recognition setting database 120. Other settings may be retrieved from a global voice recognition setting database 122. These settings may include user specific first context database 112 entries. These settings may also or alternatively include user specific second context database 114 entries. The settings retrieved may also or alternatively include confidence level thresholds (see FIG. 2 and accompanying description), adaptive settings, preferences regarding desired latency numbers, or other settings which may affect the systems and methods for multi-pass voice recognition described herein.

A voice recognition history database 140 may be maintained by context analyzer 116, voice recognition engine 110 and/or another component of voice recognition system 102. Voice recognition history database 140 may store frequency of use tabulations for many available voice tags, names, and commands. The frequency of use tabulations may be processed by context analyzer 116 to determine which tags, names, or commands should be in first context database 112 and which should reside in second context database 114. Voice recognition history database 140 may be organized in a variety of ways, according to a variety of implementations. For example, voice recognition history database 140 may be of a fixed number of records (e.g., 100 records) whereby newly used tags, names, or commands are re-added to the list and items which have not been used recently are removed from the database. Context analyzer 116 may then synchronize all or a portion of first context database 112 with the records in voice recognition history database 140 (e.g., ensuring that the most recently used 100 voice tags, names or commands are each a part of first context database 112).

Figure 2:
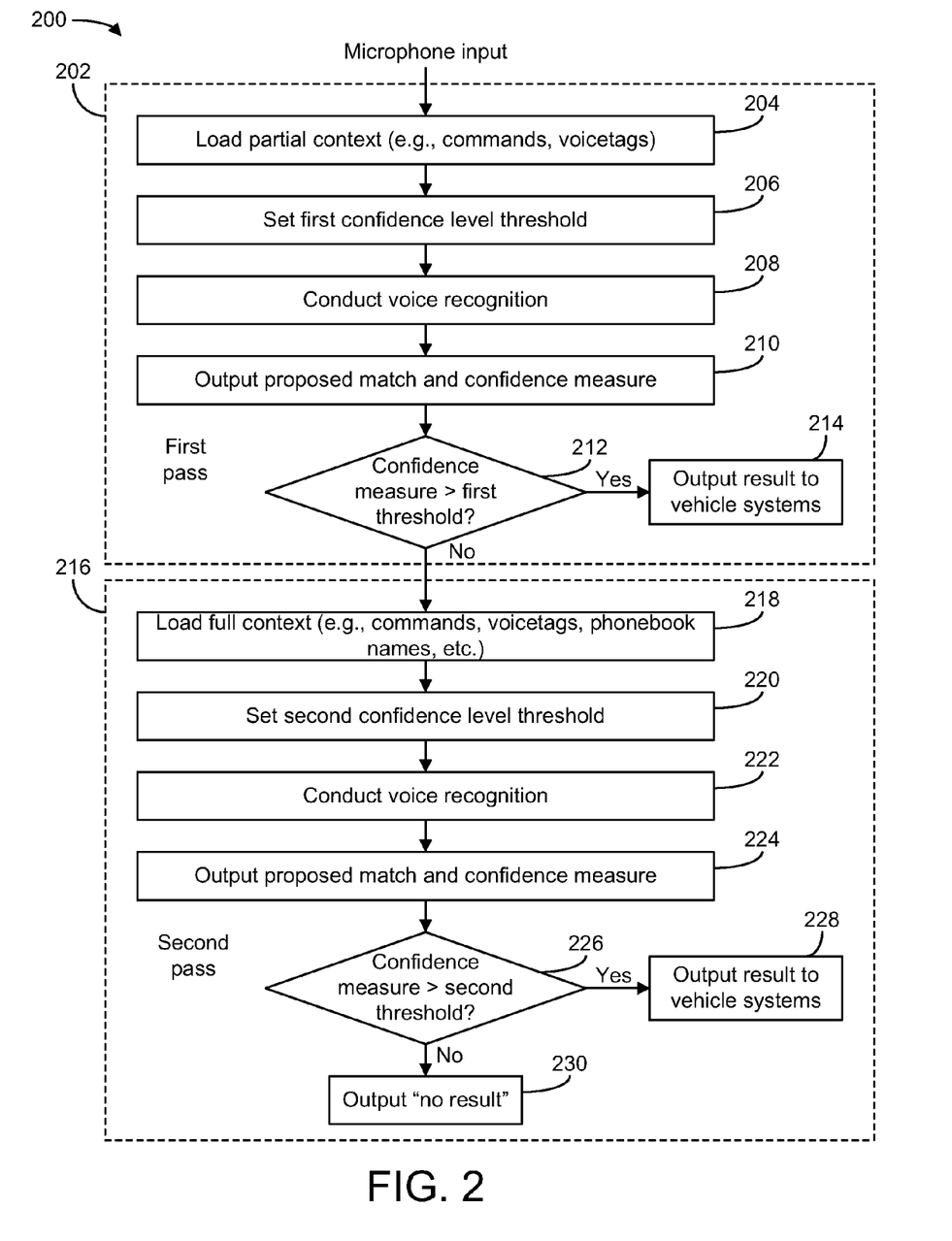
FIG. 2 is a flow chart of a process for conducting multi-pass voice recognition, according to an exemplary embodiment.

FIG. 2 provides a flow chart of an exemplary process 200 for conducting the multi-pass voice recognition described herein. Process 200 can be implemented using the systems shown and described with reference to FIGS. 1A and 1B. FIG. 2 illustrates one exemplary embodiment. Other processes for implementing multi-pass voice recognition system for a vehicle could be provided according to varying exemplary embodiments.

In process 200, a microphone input (e.g., data representations of processed analog audio, data representations of identified phonemic series, etc.) is provided to a first voice recognition pass 202 (e.g., as executed by the voice recognition engine). The processing electronics of the voice recognition system may be configured to process the received speech (e.g., by temporarily storing the audio received at the microphone as a raw digital audio recording) to obtain speech data (e.g., digital representation, a phonemic representation, a plain-text representation, etc.). In first voice recognition pass 202, the voice execution engine loads a partial context (e.g., a relatively short list of commands, names, shortcuts, or other voicetags) at a step 204. In an exemplary embodiment, the partial context includes fewer than 50 commands and voice tags. It should be noted that the microphone input may include any number of filtering, compression, expansion, noise removal, or other pre-processing steps prior to process 200 beginning or as an initial set of steps for process 200.

Process 200 may then recall, lookup, or otherwise set a first confidence level threshold (e.g., a detection threshold for the voice recognition) at a step 206. The confidence level threshold may be user specific (based on a user-determination step as described above with reference to FIG. 1B).

At step 208 voice recognition is conducted. The voice recognition of step 208 may execute a process of comparing the data representative of the received speech to the partial context (i.e., the partial set of commands and voicetags).

The result of the comparison may be output from the voice recognition engine as a proposed match and confidence measure pair at a step 210. The proposed match may be represented in any number of ways (e.g., encoded as a command ID, represented in a tagged format such as XML, represented in plain text, etc.). The confidence measure may be represented in any number of ways (e.g., a number to 100, etc.).

First voice recognition pass 202 may then compare the output confidence measure to the set first confidence level threshold at a step 212. The set first confidence level threshold may be a value indicating a percentage confidence required before the pass will return the result to the vehicle system utilizing the voice recognition. For example, if the detection threshold is 75%, the system will require the match confidence to exceed 75%. If the confidence is exceeded, then the result (e.g., the indication of which command, voicetag, or set thereof was spoken) is output to the vehicle systems (e.g., a navigation system, a hands-free telecommunication system, etc.) at a step 214.

If the confidence level was not exceeded then the voice recognition system will continue to a second voice recognition pass 216. In second voice recognition pass 216, the voice recognition system may load a larger command or voicetag set (e.g., a full context) at a step 218. For example, the voice recognition system can load a large number of names from a phonebook. If the set is large (e.g., 500-5000 items), then the latency may be higher than that of the first pass 202.

A second confidence level threshold may be recalled, loaded, or otherwise set by the system at a step 220. Voice recognition in the second pass can continue using the full context at a step 222. As explained with reference to FIGS. 3A and 3B, examining the full context may include not only evaluating the content of a second context database 114 (as shown in FIG. 1B), but also evaluating the content of a third or fourth context database in a portable user device or in a remote server.

At step 224, an output of a proposed match and confidence measure pair may be provided. The result can be checked for confidence relative to the second confidence threshold at a step 226. The output may be in the form of a piece of XML code, a delimited pair (e.g., proposed match: confidence number), or any other digital representation of the proposed match and confidence pair. In some embodiments, the proposed match is held separately and step 226 merely operates on the confidence level. In embodiments where both the proposed match and the confidence level are output, a dynamic thresholding system may be used (e.g., if a music playback command is received while the user has been conducting navigation steps, the confidence should be very high to accept such a command, etc.).

Second voice recognition pass 216 can return the result at a step 228 if the confidence level is high enough. Otherwise, the system can return no result at a step 230. In an exemplary embodiment, the required confidence level is higher in first pass 202 than in second pass 216 to ensure that second pass 216 is conducted if confidence is not relatively high. Returning a result in step 228 may include or may trigger the voice recognition system to: at least one of: (a) output an indication of the match along with the matched name or command (e.g., so that the voice recognition system can provide the matched name or command to a user application such as a navigation application), and (b) cause the execution of a vehicle function based on the match.

In an exemplary embodiment, step 228 can also trigger the execution of a process which adapts the contents of the first context database (e.g., database 112 shown in FIG. 1B). For example, a frequency table (e.g., as stored in a voice recognition history database 140) for different commands or other voice tags may be updated. Based on the update, a frequently used item may be moved to the first context database while an item which is less frequently used (or not recently used) can be removed from the first context database. In an exemplary embodiment the first context database may be kept to a set size. In another embodiment, the latency or other recognition performance of the first database may be tracked. As long as the latency does not increase beyond a threshold, for example, voice recognition commands or items may continue to be added to the first context database. It should be noted that the first context database may be implemented in hardware and software for high performance. For example, the contents of the first context database may be continually reorganized (e.g., in a B-Tree or another structure organized for speed). Moreover, the first context database may be caused to be loaded into high speed RAM or cache by the voice recognition engine upon boot. Other or alternative software or hardware speed optimizations may be conducted on the first context database which are not carried over to the larger second context database.

Referring again to FIGS. 1A and 1B, in various exemplary embodiments the first voice recognition pass and the second voice recognition pass are conducted without assistance from a remote system. In other words, the partial set of commands and names and the complete or larger set of commands and names are loaded from memory local to the voice recognition system.

Figure 3A:
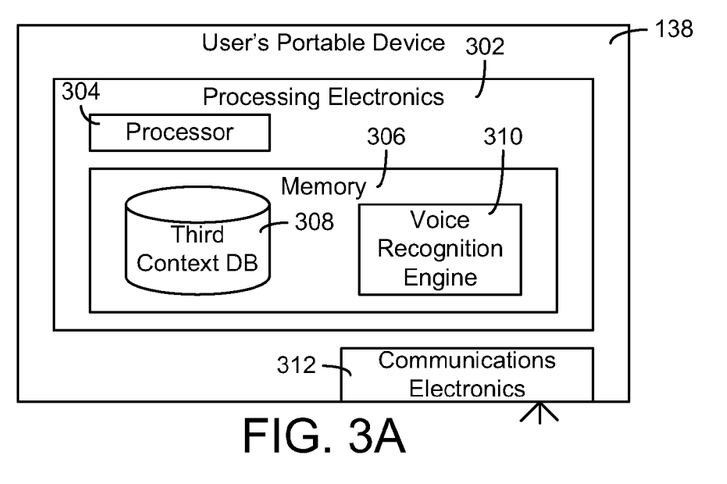
FIG. 3A is a block diagram of a user portable device such as that shown in FIG. 1B, according to an exemplary embodiment.

Referring now to FIG. 3A, a block diagram of user's portable device 138 (which may be the same as that shown in FIG. 1B) is shown. User's portable device 138 shown in FIG. 3A can together form a speech recognition system with vehicle recognition system 102 of FIG. 1B. User's portable device 138 is shown to include processing electronics 302. Processing electronics 302 may generally be of the type described above with respect to the voice recognition system or may be of a different type (e.g., thin flexible circuitry having an ARM mobile device processor, etc.). Processor 304 and memory 306 may be general purpose devices or devices of a type configured to support a particular operating environment (e.g., Android, iOS, etc.). In some embodiments, user's portable device 138 may be an iPhone, iPad, Android phone, Android tablet, or another type of portable user device upon which data can be stored and applications run. An 'app' or another type of software installation may be loaded into user's portable device 138 (e.g., via an 'app' store into memory 306) which, when executed by processing electronics 302 (i.e., including processor 304), can handle requests for further voice recognition processing from vehicle recognition system 102. Upon receiving a request for further processing, a voice recognition engine 310 can compare speech parts (e.g., received with the request) and compare the speech parts (i.e., a word, a phrase, a phonemic representation of received audio, another type of digital representation of the speech received by the voice recognition system 102, etc.) with information in the third context database 308. Third context database 308 may provide another layer of contextual understanding. Third context database 308, in certain embodiments or situations, may be easier to update than the context databases stored in the vehicle. Therefore, new commands issued by the vehicle manufacturer or supplier can be distributed to the user portable device 'app', thus allowing easy expansion of the voice recognition commands or other voice tags without requiring a service or user-driven update of the vehicle software. If user's portable device 138 successfully matches the speech part with content of third context database 308, then user's portable device 138 can return match information (e.g., in the form of XML information regarding the command or voice tag) to the vehicle control system via communications electronics 312 (e.g., a Bluetooth transceiver, a wired USB terminal, WiFi, etc.).

Figure 3B:
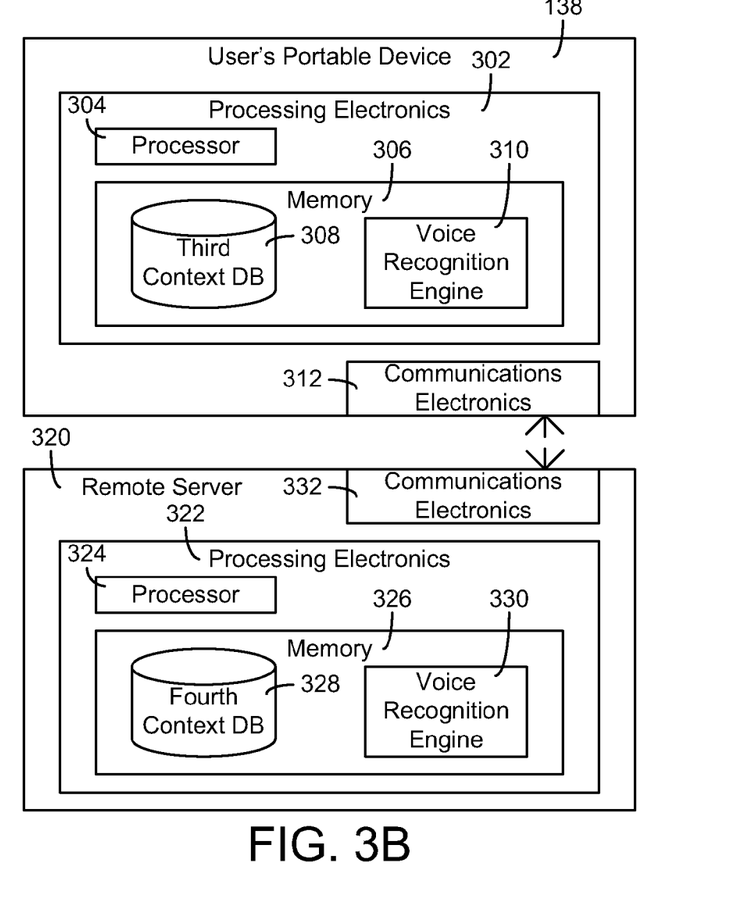
FIG. 3B is a block diagram of a user portable device such as that shown in FIG. 1B, wherein the device is configured for further communication with a remote server, according to an exemplary embodiment. The vehicle voice recognition system of FIG. 1B, the user portable device of FIGS. 1B, 3A, and 3B, and the remote server of FIG. 3B can be combined to form a system, according to various exemplary embodiments.

Referring now to FIG. 3B, the embodiment illustrated assumes that the overall system includes voice recognition system 102 (as shown in FIG. 1B), user's portable device 138 (as shown in FIGS. 1B, 3A, and 3B), as well as a remote server 320. Remote server 320 is shown to include communications electronics 332 and processing electronics 322. Processing electronics 322 includes processor 324 and memory 326. Memory 326 includes fourth context database 328 and voice recognition engine 330. In an exemplary embodiment, when both the vehicle voice recognition system 102 and the user's portable device 138 do not have the appropriate match for a received speech part, then user's portable device 138 can forward the speech part and a request for further processing to remote server 320. Remote server 320, and more particularly voice recognition engine 330 is configured to use the request and the speech part to attempt a match in fourth context database 328. If a match is found in fourth context database 328, then information regarding the match (e.g., in the form of a plain-text version of the match, in the form of XML-marked data, etc.) is forwarded to user's portable device 138 (e.g., via a cellular connection formed by the communications electronics 312, 332). User's portable device 138 can then forward the information onto the vehicle voice recognition system 102.

In the event the user of the vehicle indicates that the match identified by third context database 308 or fourth context database 328 is correct, then match information, voice tag information, phoneme information, or any other information needed for the vehicle itself to process the match in the future may be provided from remote server 320 and/or user's portable device 138 to the vehicle voice recognition system 102. The vehicle voice recognition system 102 can store the received information in first context database 112 or second context database 114 for use in future first passes or second passes. In an exemplary embodiment, voice recognition failures of first context database 112 or second context database 114 can be sent to user's portable device 138 and/or remote server 320 for processing asynchronously with the activity of the vehicle voice recognition system 102. For example, while returning a failure to the user, the vehicle voice recognition system 102 can send the speech part resulting in the failure to user's portable device 138 and/or remote server 320 for the purpose of learning the speech. Later, voice recognition system 102 can request feedback from the user for adapting its local context databases. For example, voice recognition system 102 may state "Earlier you said 'Find Sinatra', did you mean 'Play Songs Having Frank Sinatra as an Artist?'." If the user answers affirmatively, a context matching speech parts (e.g., a phonemic pattern) for "Find Sinatra" can be added to first context database 112 as a match for: "Command: Music Playback; Artist: Frank Sinatra." Thus, not only can first context database 112 be adaptively updated with context information from second context database 114, but both first and second context database 112, 114 can be adaptively updated using additional processing from user's portable device 138 and/or remote server 320.

The methods described herein may be computer-implemented methods and may be executed by one or more computer systems or electronic systems as described herein. Instructions for causing the computer systems to complete the activities of the above-described methods may be embodied on computer-readable media such as a CDROM, flash drive, or otherwise. All such embodiments of the invention are within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present application is not limited to the details or methodology set forth in the description or illustrated in the figures. It should also be understood that the terminology is for the purpose of description only and should not be regarded as limiting.

What is claimed is:

1. A voice recognition system for a vehicle, comprising:
    a microphone for receiving speech from a user;
    a memory comprising a user specific voice recognition setting database associating at each of a plurality of users with a first set of user-specific commands or names for voice recognition and a second set of user-specific commands or names for voice recognition including at least one command or at least one name not included in the first set; and
    processing electronics in communication with the microphone and the memory, wherein the processing electronics are configured to:
    identify the user;
    process the received speech to obtain speech data;
    conduct a first speech recognition pass, the first speech recognition pass comprising:
        comparing the speech data to the first set associated with the identified user to obtain a first proposed match and a first confidence of the comparison between the speech data and the first set; and
        determining the first proposed match to be a first match if the first confidence exceeds a first level of confidence;
    in response to the first match not being determined, conduct a second speech recognition pass, the second speech recognition pass comprising:
        comparing the speech data to the second set associated with the identified user to obtain a second proposed match and a second confidence of the comparison based on the comparison between the speech data and the second set; and
        determining the second proposed match to be a second match if the second confidence exceeds a second level of confidence.

2. The voice recognition system of claim 1, wherein the memory is a part of the processing electronics.

3. The voice recognition system of claim 1, wherein the processing electronics are configured to skip the second pass when the required first level of confidence is met or exceeded in the first pass.

4. The voice recognition system of claim 3, wherein the processing electronics are configured to adaptively update the first level of confidence based on user feedback received at the microphone or received at a user input device.

5. The voice recognition system of claim 4, wherein a different first level of confidence for the first pass and a different partial set of commands or names are associated with different users of the vehicle or different user devices.

6. The voice recognition system of claim 1, wherein the first set of commands or names for voice recognition comprise the most recently used items, wherein the items comprise multiple categories of commands or names.

7. The voice recognition system of claim 1, wherein the first set of commands or names for voice recognition comprise at least one of:
    (a) a partial set of commands,
    (b) a partial set of voice tags, and
    (c) a set of user-specified favorite contacts or user-specified favorite phonebook names.

8. The voice recognition system of claim 1, wherein the first set of commands or names for voice recognition comprise at least one of:

(a) a set of most frequently used commands,
(b) a set of most frequently used voice tags, and
(c) a set of most frequently used contacts or phonebook names.

9. The voice recognition system of claim 1, wherein the processing electronics are further configured to update the first set of commands or names for voice recognition in the first pass as the frequency of use changes for the commands or names.

10. A computerized method for use by a voice recognition system for a vehicle, the method comprising:
receiving speech from a user at a microphone;
identifying the user;
loading a first set of user-specific commands or names associated with the identified user from a user specific voice recognition setting database in memory;
conducting a first voice recognition pass by comparing a representation of the received speech to the loaded first set of commands or names to obtain a first proposed match and a first confidence;
determining whether the first proposed match is a first match between the first set and the representation of the received speech if the first confidence meets or exceeds a first confidence level;
when the first proposed match is not determined to be a first match,
conducting a second voice recognition pass by comparing the representation of the received speech to a second set of user-specific at least one command or at least one name not included in the first set, the second set associated with the user in the user specific voice recognition setting database, to obtain a second proposed match and a second confidence;
determining whether the second proposed match is a second match between the second set and the representation of the received speech if the second confidence meets or exceeds a second confidence level; and
at least one of: (a) outputting an indication of the first match or the second match for user confirmation if the first match or the second match is determined, or
(b) executing a vehicle function based on the first match or the second match if the first match or the second match is determined.

11. The method of claim 10, wherein the first pass and second pass are conducted without assistance from a remote system.

12. The method of claim 10, wherein the first set and the second set are loaded from memory local to the voice recognition system.

13. The method of claim 10, wherein the first confidence level and the second confidence level are different.

14. The method of claim 13, wherein the first confidence level is higher than the second confidence level.

15. The method of claim 14, further comprising:
adaptively updating the first confidence level based on user feedback received at the microphone or received at a user input device.

16. The method of claim 15, wherein adaptively updating comprises raising the first confidence level in response to the user feedback indicating that results of first passes were not correct.

17. The method of claim 15, wherein adaptively updating comprises lowering the first confidence level in response to the user feedback indicating that results of the first passes were correct.

18. The method of claim 10, further comprising:
maintaining a different first set of commands or names for each of a plurality of different users or user devices of the voice recognition system.

19. The method of claim 10, wherein the first set of commands or names for voice recognition comprise at least one of:
(a) a set of most frequently used commands,
(b) a set of most frequently used voice tags, and
(c) a set of most frequently used contacts or phonebook names.

20. The method of claim 19, further comprising:
updating the first set of commands or names for voice recognition in the first pass as the frequency of use changes for the commands or names.

* * * * *